Nov. 9, 1965  F. J. HARTWIG  3,216,815
TAPPING NOZZLE FOR MOLTEN REFRACTORIES
Filed Nov. 10, 1960  2 Sheets-Sheet 1
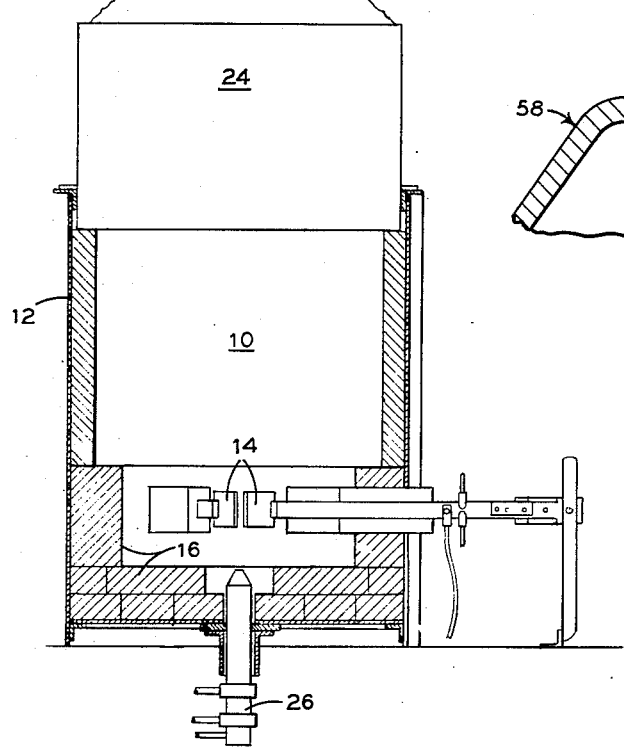
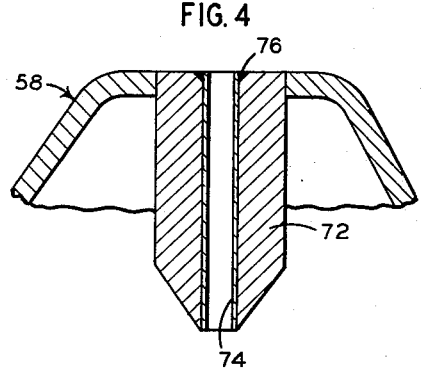
INVENTOR.
Frederick J. Hartwig
BY
ATTORNEY Nov. 9, 1965   F. J. HARTWIG   3,216,815
TAPPING NOZZLE FOR MOLTEN REFRACTORIES
Filed Nov. 10, 1960   2 Sheets-Sheet 2
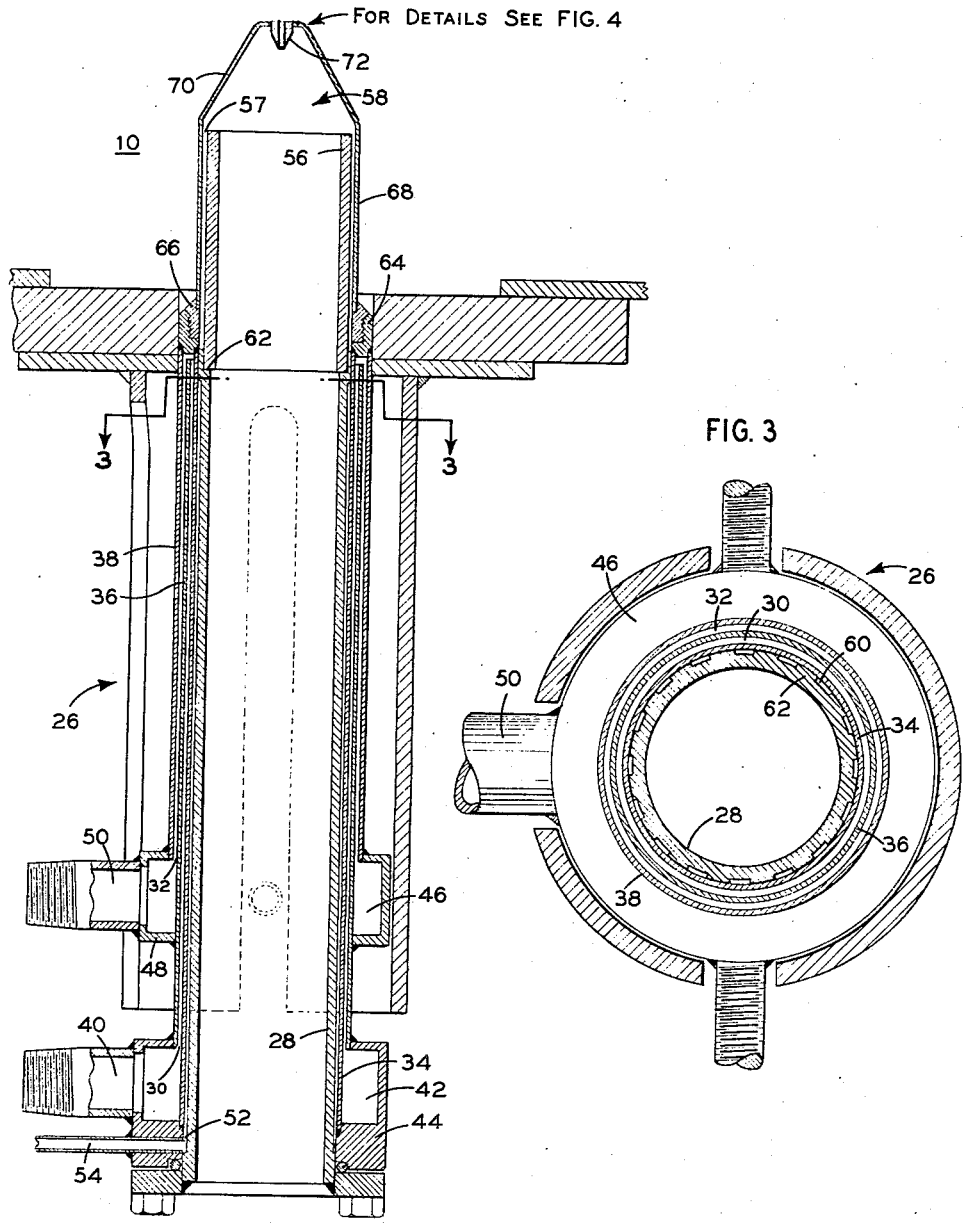

United States Patent Office 3,216,815
Patented Nov. 9, 1965

3,216,815
TAPPING NOZZLE FOR MOLTEN REFRACTORIES
Frederick J. Hartwig, Alliance, Ohio, assignor to The Babcock & Wilcox Company, New York, N.Y., a corporation of New Jersey
Filed Nov. 10, 1960, Ser. No. 68,409
5 Claims. (Cl. 65—326)

This invention relates in general to a refractory melting furnace and more particularly to a new and improved tapping nozzle with a vastly increased service life as compared to the tapping nozzles as presently used in the production of molten refractories.

As disclosed in my Patent No. 2,817,695, it has been found desirable to produce a mineral wool formed from molten kaolin for use in applications where other types of mineral wools are unsuitable or unsatisfactory, such as prolonged operation at temperatures in the order of 1500–2300° F. The mineral wool is formed by melting the kaolin which may be initially in the form of pieces of grog or clinker made by calcining the raw material to eliminate the water. The molten material is withdrawn from the furnace as a stream or a series of droplets and subjected to a high velocity jet of air or steam which transforms the molten material into long fibers.

In the production of mineral wool from molten refractory materials, it is desirable to tap the furnace continuously, rather than to tap intermittently, as in "batch" melting. This is particularly true in the case of high melting point refractory materials, such as kaolin, as the periodic stoppage of the furnace heating in order to pour batches of the molten material results in solidification of a portion of the charge. This introduces operating difficulties in re-starting the furnace since a portion of the electrodes or other heating elements will be imbedded in the solidified residue.

As disclosed in Patent No. 2,714,622, because of the extremely high temperatures of these molten refractory materials, it has not been possible to release them in molten state through either heated or uncooled orifices. This was because no structural material was known which possessed sufficient refractoriness while being sufficiently insoluble in and non-reactive with these molten refractory compositions at these high temperatures. As disclosed in both of the above-mentioned patents, the tapping nozzles have thus been overcooled and then subsequently reheated in accordance with temperature measurement of the tapped melt to maintain the tapping nozzle at the optimum temperature for tapping. As disclosed in Patent No. 2,714,622, this results in the solidification of a thin layer of the refractory material on the nozzle which then protects the nozzle from the molten refractory. One way of supplying this heat increment for maintaining the optimum temperature was to apply a controlled potential between the tapping nozzle and an electrode to effect resistance heating of the melt right at the tapping nozzle. A controller for maintaining such a controlled potential has been shown and described in Patent No. 2,730,560.

Previously, the tapping nozzle has been in the form of a cone of drawn tungsten positioned on the upper end of a drawn tungsten cylinder integral with the cone, with the apex of the cone flattened and centrally apertured to receive the forged tungsten nozzle proper. Nozzles of this contour directed the molten material axially of a re-entry tube and in spaced relation to the inner surface thereof.

However, it has been my experience that, even using nozzles formed of such high metling point material as tungsten, the service life of these nozzles is limited to approximately 250 hours, or 10 days, of continuous operation. At the end of that period the melting furnace had to be shut down and the tungsten nozzle replaced. Not only did this result in the maintenance described in the above mentioned patents, but the frequent replacement of the tungsten nozzles has become an important item in the overall production costs of the refractory wool.

It has been found that the useful life of the tapping nozzle may be increased by as much as forty times that of nozzles presently in use by providing the central tap opening with a lining of iridium. In accordance with the present invention a nozzle having iridium metal in contact with the molten refractory will have an operating life of nearly a year as compared to about 10 days for nozzles presently used.

The various features of novelty which characterize my invention are pointed out with particularly in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:

FIG. 1 is a vertical or axial sectional view of a refractory melting furnace;

FIG. 2 is an enlarged axial sectional view of the tapping nozzle assembly;

FIG. 3 is a sectional view of the tapping nozzle assembly taken along line 3—3 of FIG. 2; and FIG. 4 is a sectional detail of the tapping nozzle as noted in FIG. 2.

Referring to FIG. 1, the electric resistance melting furnace 10 comprises a generally cylindrical and upright metal casing 12 having water cooled electrodes 14 extending therethrough and connected to a suitable source of electric power. The interior of the metal casing is lined with built-up refractory shapes to provide lining 16. The kaolin, or other refractory material, is supplied to furnace 10 from an elevated hopper 18 through a discharge spout 20 controlled by a valve 22 and builds up through and above a cylindrical metal extension 24 which is removably supported on the upper end of furnace 10. The refractory charge is preferably kept heaped above the upper end of extension 24 to provide a substantial "head" for the furnace charge. A tapping nozzle assembly 26 is mounted centrally of the furnace.

Referring to FIGS. 2 and 3, the re-entrant tapping nozzle assembly 26 is slidably mounted for movement axially into and out of the furnace 10. The tapping nozzle assembly comprises in part a support tube 28 which is cooled by water flowing through interconnected annular concentric flow passages 30 and 32 formed about the support tube by tubes 34, 36, and 38. Coolant fluid is supplied via an inlet nozzle 40, thence through an inlet annulus 42 formed by a channel-like member 44 to the serially connected flow passages 30 and 32. The coolant, after flowing through passages 30 and 32, is discharged into annulus 46 formed by a circular channel member 48 and then to outlet nozzle 50.

Another annular space 52 is formed between the support tube 28 and the inner tube 34 and is connected to a source of helium via a line 54. The annular space 52 opens at the upper end of the support tube 28 by means of slots 60 to the space 57 formed by a guide sleeve 56 and a nozzle 58. The guide sleeve 56 is made of alumina or similar refractory material and fits in a seat 62 formed in the upper end of the support tube. The upper end of both the inner and outer tubes 34 and 38 is secured to an internally threaded annular spacer ring 64 which receives a nozzle support ring 66 which is integral with the nozzle 58.

The nozzle consists of a cylindrical portion 68 secured in the support ring 66 and a frusto-conical portion 70 wherein the nozzle tip 72 is located. The nozzle may be formed of tungsten or molybdenum having iridium on that portion of the nozzle which would come in contact with the molten refractory material. As illustrated, the nozzle tip 72 has an axial opening extending therethrough. FIG. 4 shows an enlarged cross section of the nozzle tip 72 with an iridium insert or lining 74 therein. In the specific construction shown, I have found that it is possible to provide a tubular iridium insert 74, welded as at 76 to the nozzle tip 72. In this case the iridium insert has an inside diameter of 0.133 inch and a thickness of 0.021 inch.

In operation, prior to starting the furnace, coolant flow is initiated in the tap assembly 26. Coolant for the assembly enters through inlet nozzle 40 into the annulus 42, flows upwardly in the annular space 30 between tubes 34 and 36 over the top of tube 36, downwardly in the annular space 32 between tubes 36 and 38, into annulus 46 and out through the outlet nozzle 50. Helium for pressure sealing is supplied to line 54, from a source not shown, and flows into and upward within the annular space 52 through slots 60 in the upper end of the support tube 28, then into annular space 57 formed by sleeve 56 and nozzle 58 and down inside tube 56 and support tube 28. The helium flow rate and pressure are maintained at such values as to provide an effective barrier against air leaking into the tap assembly 26 and coming in contact with nozzle assembly 58 which is at a very high temperature due to its immersion in the pool of molten kaolin or similar high melting point refractory material.

It has been my experience that, even when using a nozzle made of a high melting point metal such as tungsten, and cooling the nozzle below the melting point of the refractory material with subsequent reheating the nozzle to maintain a solid coating thereon as disclosed in the above mentioned patents, the useful life of the tapping nozzle has been in the order of only ten days. Inasmuch as the melting point of tungsten is well above the temperature prevailing in a refractory melting furnace, it became apparent to me that some mechanism other than melting of the metal was involved in the short life of the nozzle.

Upon investigation I have found that using an iridium insert as disclosed above, the life span of the tapping nozzle increases from about 10 days to a year; or nearly 40 times. Specifically, tests show that the wear on the inside diameter of the tungsten portion of the nozzle progressed at the rate of 0.001 inch per hour, on the average, whereas the total wear on the iridium insert, upon completion of a ten day continuous run, was but 0.004 inch on the diameter.

In addition, using the tapping nozzle with an iridium insert, it is possible to completely eliminate the necessity of secondary heating of the nozzle. Thus it is possible to eliminate from the operation the elaborate and expensive temperature control mechanisms disclosed in the above mentioned patents. As a result of dispensing with the nozzle temperature controller, the savings obtained thereby offset the increased cost of using the iridium insert.

Further savings are apparent when the increased production over the longer run of the melting furnace is realized. These savings are due to the lack of downtime previously necessitated by the replacement of the tapping nozzles.

Further, as taught in the above references, the loss of electrodes and other miscellaneous furnace parts as a result of the solidification of the refractory material is greatly reduced.

While I show an iridium insert, it is understood that a nozzle tip 72 or even an entire nozzle 58 formed of iridium would be practical. However, due to the high cost of iridium and the difficulty of machining it, it would be more practical to coat or plate the nozzle tip 72 or nozzle 58 made of tungsten or molybdenum, for instance, with a thin coating or iridium so that the tapping nozzle would have iridium in that area which would be in contact with the molten refractory material.

While in accordance with the provisions of the statutes I have illustrated and described herein the best forms and modes of operation of the invention now known to me, those skilled in the art will understand that changes may be made in the forms of the apparatus disclosed without departing from the spirit of the invention covered by my claims, and that certain features of my invention may sometimes be used to advantage without a corresponding use of other features.

What is claimed is:

1. In a furnace for melting refractory material at a temperature higher than 2700° F., a bottom tap assembly comprising a generally upwardly extending tubular support structure formed with passages for circulation of coolant therethrough, a tapping nozzle connected to the upper end of said support structure, said nozzle having a surface normally in contact with said molten refractory and formed of iridium.

2. In a furnace for melting refractory material at a temperature higher than 2700° F., a bottom tap assembly comprising a generally upwardly extending support structure formed with passages for circulation of coolant therethrough, a tapping nozzle unit connected to the upper end of said support structure in the form of a substantially hollow member of a high melting point material, said nozzle having a tap opening communicating with the interior of said support structure, said central tap opening having a lining or iridium.

3. In a furnace for melting refractory material at a temperature higher than 2700° F. having a tapping nozzle with a tap opening communicating with the interior of said furnace, said tap opening having a lining of iridium.

4. In a furnace for melting refractory material at a temperature higher than 2700° F. having a tapping nozzle with a tap opening communicating with the interior of said furnace, said tap opening having a rigid lining of iridium.

5. In a furnace for melting refractory material at a temperature higher than 2700° F. having a tapping nozzle with a tap opening communicating with the interior of said furnace, said tapping nozzle being made of tungsten, and said tap opening having a rigid lining of iridium.

References Cited by the Examiner

UNITED STATES PATENTS

| | | | |
|---|---|---|---|
| 2,106,527 | 1/38 | Hostetter | 65—374 |
| 2,276,295 | 3/42 | Ferguson | 13—6 |
| 2,777,254 | 1/57 | Siefert et al. | 50—413 |
| 2,803,925 | 8/57 | Klausmann | 65—374 |
| 2,817,695 | 12/57 | Hartwig | 13—33 |

OTHER REFERENCES

"Handbook of Chemistry and Physics," Twenty-Eighth Ed., Editor in Chief Charles D. Hogman, Published by Chemical Rubber Publishing Co., Cleveland, Ohio, 1944, page 294.

DONALL H. SYLVESTER, *Primary Examiner.*

PERCY L. PATRICK, MORRIS O. WOLK, *Examiners.*